May 24, 1949.    M. L. KOVAC    2,470,854
HEATING TOOL
Filed Aug. 10, 1946
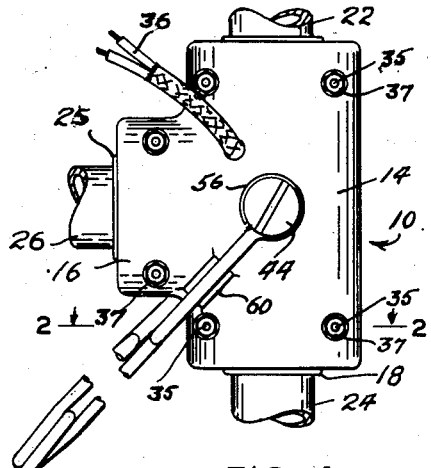
FIG-1-
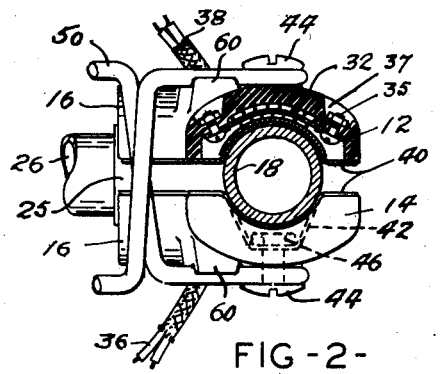
FIG-2-
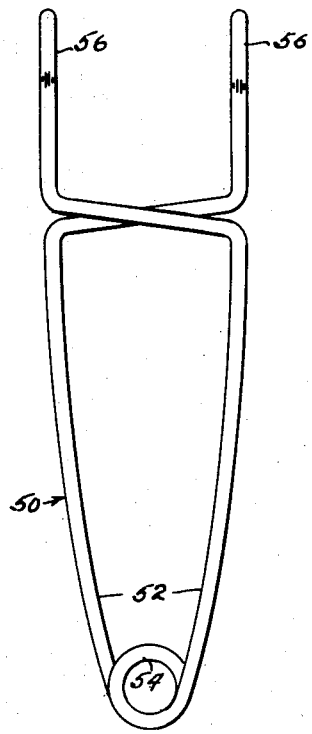
FIG-3-
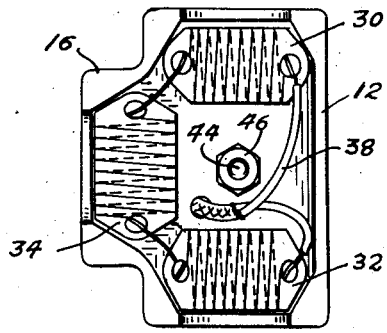
FIG-4-
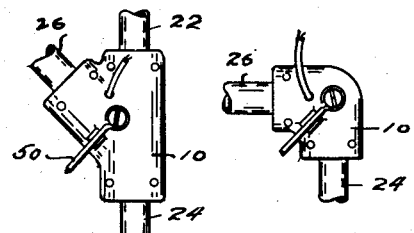
FIG-5-   FIG-6-
INVENTOR.
MICHAEL L. KOVAC
BY
ATTORNEY Patented May 24, 1949

2,470,854

UNITED STATES PATENT OFFICE 2,470,854

HEATING TOOL

Michael L. Kovac, Garfield, N. J.

Application August 10, 1946, Serial No. 689,650

4 Claims. (Cl. 219—21)

This invention relates to improvements in heating tools, and is particularly directed to a tool or device for heating elements to be joined together by soldering.

More specifically, the invention is directed to an electric heating device adapted to fit about a pipe joint or coupling whereby the parts of the joint or coupling may be heated to melt solder applied thereto, which after setting results in a perfect bond or soldered joint.

Heretofore in heating pipe couplings to solder sections of pipes together it has been customary to employ a blow torch. The use of a blow torch has many objections among which is the failure to apply a uniform heat due to moving the torch from place to place on the joint. Another objection is that in applying the torch to a joint adjacent a wall of a building there is the danger of the wall being burned. In many instances where the coupling to be soldered is close to a wall it is impossible to apply heat to the portion of the joint adjacent the wall due to limited space. This is true whether the heat is applied by a blow torch or an ordinary soldering iron.

One of the objects of the present invention resides in the provision of a tool which will overcome all of the afore-recited objections and disadvantages of joint heating devices.

Another object is the provision of a tool of the character indicated which will fit about a pipe coupling regardless of the restricted space between the coupling and the wall.

Another object of the present invention resides in the provision of a tool which will apply uniform heat to the parts of the joint.

A further object of the invention is the provision of a tool which will fit about the vertical and horizontal, or the vertical and angular portions of the coupling.

A still further object of the present invention resides in the provision of a tool which is portable, economical to manufacture, and of such rugged construction as to withstand the uses to which it is put when in service.

Other and further objects of the present invention will be manifest from the following description and the accompanying drawing, in which drawing:

Fig. 1 is a side elevational view of the device of the present invention applied to a tee pipe coupling;

Fig. 2 is a view partly in section, taken substantially on line 2—2 of Fig. 1 looking in the direction of the arrows;

Fig. 3 is an elevational view of the handle of the tool;

Fig. 4 is an elevational view of the inside of one section or half of the tool of Fig. 1; and Figs. 5 and 6 show two modified forms of the tool of the present invention.

Referring to the drawing in detail the heating tool 10 comprises two sections or jaws 12 and 14 preferably made of ceramic material, but which may be made of any other suitable dielectric material. Each section is elongated and semi-circular in cross-section and has an integral lateral projection 16, also semi-circular in cross-section, substantially midway of its top and bottom edges and extending at right angles to the vertical axis of the section.

The inner walls of the sections and their extensions are curved, whereby to adapt them to fit about a cylindrical pipe coupling 18 having a vertically extending portion 20, within which the ends of two vertical pipes 22 and 24 to be joined, are inserted. The coupling of Fig. 1 also has a cylindrical laterally projecting portion 25, within which the end of a horizontal pipe section 26 to be joined, is inserted.

When the two sections 12 and 14 are in juxtaposition, as shown in Fig. 2, they form a substantially cylindrical enclosure for the vertical portion of the coupling 18, and the extensions 16 of the sections form a substantially cylindrical enclosure for the projecting portion 25 of the coupling.

Each of the sections 12 and 14 is provided with electric resistance heating elements 30, 32 and 34. The elements 30 and 32 are positioned in the upper and lower areas, respectively, of the vertical portion of the section, and the element 34 is positioned in the lateral extension 16. These elements each are curved to conform to the contour of the inner wall of the section, and are held in place by small bolts 35, the nuts of which are held in recesses 37 formed in the sections.

The portions of the coupling to be heated are the portions in which the pipe sections are inserted, hence, it will be seen that the positioning of the separate heating elements in the manner illustrated and described will insure the proper portions of the coupling being uniformly heated.

The three elements of each section may be electrically connected in series in separate circuits for each section, or each group of elements may be in the same circuit. The circuits include wires 36 for the circuit of the elements of section 14 and wires 38 for the circuit of the elements of section 12. The wires 36 and 38 lead to a source of electric energy (not shown), which may be a house current with suitable transformers, or when the device is to be used in a building under construction or at a location where house current is not readily available, a battery may be employed as the source of current.

A conventional electric switch (not shown) may be provided for closing and opening the circuits to the heating elements. Such switch may be mounted on the handle of the device, connected in the wires, or at any other convenient location whereby the opening and closing of the circuit can be readily controlled by the operator.

A shield or cover 40 is provided for the elements of each section, which shield is curved to conform to the contour of the section and adapted to contact the coupling as will be more fully described hereinafter. The shields 40 each have a portion 42 bent inwardly in U-shaped formation to fit into a recess formed in the inner wall of each section, which formation is apertured to receive a screw 44 on which the shield is held by a nut 46.

The screw 44 also comprises securing means for a handle 50, shown in Fig. 3. This handle preferably comprises a pair of integral arms 52 joined to each other by a spring loop 54, the arms crossing each other at a point adjacent their ends opposite the spring loop. The free ends of the arms are provided with loops or eyes 56 adapted to be engaged by the screws 44 whereby to secure the handle to the tool. Each section has two pairs of lugs 60 formed on its exterior for engaging the arms of the handle and retaining the same fixed in position, whereby the handle will extend from the tool at an angle of approximately forty-five degrees to the longitudinal axis of the tool.

When the tool is to be used to heat a coupling it is applied to the coupling by pressing the arms 52 of the handle toward each other. This will separate the sections sufficiently to span the coupling. The tool is then applied to the coupling, the pressure on the arms of the handle is then released and the switch turned on to close the circuit to the heating elements.

When the tool is applied to the coupling and the sections of pipe to be coupled are inserted in three recesses or outlets of the coupling and solder applied in the usual manner, the heat generated by the tool will cause the solder to run. Thereafter the tool is removed from the coupling by again pressing the arms of the handle toward each other to separate the sections for ready removal.

The walls of sections are of as little thickness as possible so that the sections will encompass the coupling regardless of the close proximity of the coupling to a wall. Should the coupling actually contact the wall, the flexibility of the piping is sufficient to permit the coupling to be withdrawn slightly to permit application of the tool.

If desired the sections may be made of metal and the handle and other parts of the tool suitably insulated.

The modifications shown in Figs. 5 and 6 are of the same construction as the tool of Fig. 1 except that they are shaped to accommodate a forty-five degree and a ninety degree coupling, respectively. It is to be understood that the tool of the present invention may be made in any desired shape.

While I have illustrated and described preferred embodiments of my invention, it is to be understood that I do not wish to be limited to these precise constructions and arrangements, as obviously various changes and modifications may be made therein without departing from the spirit and scope of my invention.

What I claim is:

1. A heating tool of the class described comprising a pair of separable jaws having portions disposed relative to each other whereby to substantially surround sections of a pipe coupling, each of said jaws having a concave recess for the reception of its respective coupling section, a plurality of electric heating elements in each of said jaws, a shield covering the heating elements in each of said jaws and conforming to the contour of said recesses, a unitary handle of spring material having a pair of arms connected to said jaws normally retaining the jaws in operative position on a coupling, and a common connection for removably securing the heating elements in said recesses and for providing a pivotal mounting for said arms.

2. A heating tool of the class described comprising a pair of separable jaws having portions disposed relative to each other whereby to substantially surround sections of a pipe coupling, each of said jaws having a concave recess for the reception of its respective coupling section, a plurality of electric heating elements in each of said jaws, a shield covering the heating elements in each of said jaws and conforming to the contour of said recesses, a unitary handle of spring material having a pair of arms connected to said jaws normally retaining the jaws in operative position on a coupling, a common connection for removably securing the heating elements in said recesses and for providing a pivotal mounting on said arms, and means on the jaws cooperating with said arms for positioning the arms at a predetermined angle relative to the jaws.

3. A heating tool of the class described comprising a pair of separable jaws of dielectric material having portions disposed at an angle to each other whereby to substantially surround main and branch sections of a pipe coupling, each of said jaws having a concave recess for the reception of its respective coupling section, a plurality of electric heating elements in each of said jaws connected in series with each other, a shield covering said heating elements and conforming to the contour of said recesses, a unitary handle of spring material having a pair of arms connected to said jaws normally retaining the jaws in operative position on a coupling, and a common connection for removably securing the heating elements in said recesses and for providing a pivotal mounting for said arms.

4. A heating tool of the class described comprising a pair of separable jaws of dielectric material having portions disposed at an angle to each other whereby to substantially surround main and branch sections of a pipe coupling, each of said jaws having a concave recess for the reception of its respective coupling section, an electric heating element in each of said jaws connected in series with each other, a shield covering said heating elements and conforming to the contour of said recesses, a unitary handle of spring material having a pair of arms connected to said jaws normally retaining the jaws in operative position on a coupling, and a removable stud providing a common connection for removably securing the heating elements and shield in said recesses and for providing a pivotal mounting for said arms.

MICHAEL L. KOVAC.

REFERENCES CITED

The following references are of record in the file of this patent:

UNITED STATES PATENTS

| Number | Name | Date |
|---|---|---|
| 688,153 | Ayer | Dec. 3, 1901 |
| 1,475,356 | Tausche | Nov. 27, 1923 |
| 1,845,475 | Benson | Feb. 16, 1932 |
| 2,001,538 | Mueller et al. | May 14, 1935 |
| 2,012,658 | Cranon | Aug. 27, 1935 |
| 2,278,335 | Stearns | Mar. 31, 1942 |